(No Model.) 2 Sheets—Sheet 1.
C. E. BURNS.
MACHINE FOR MANUFACTURING CYLINDRICAL BLOCKS.
No. 248,018. Patented Oct. 11, 1881.
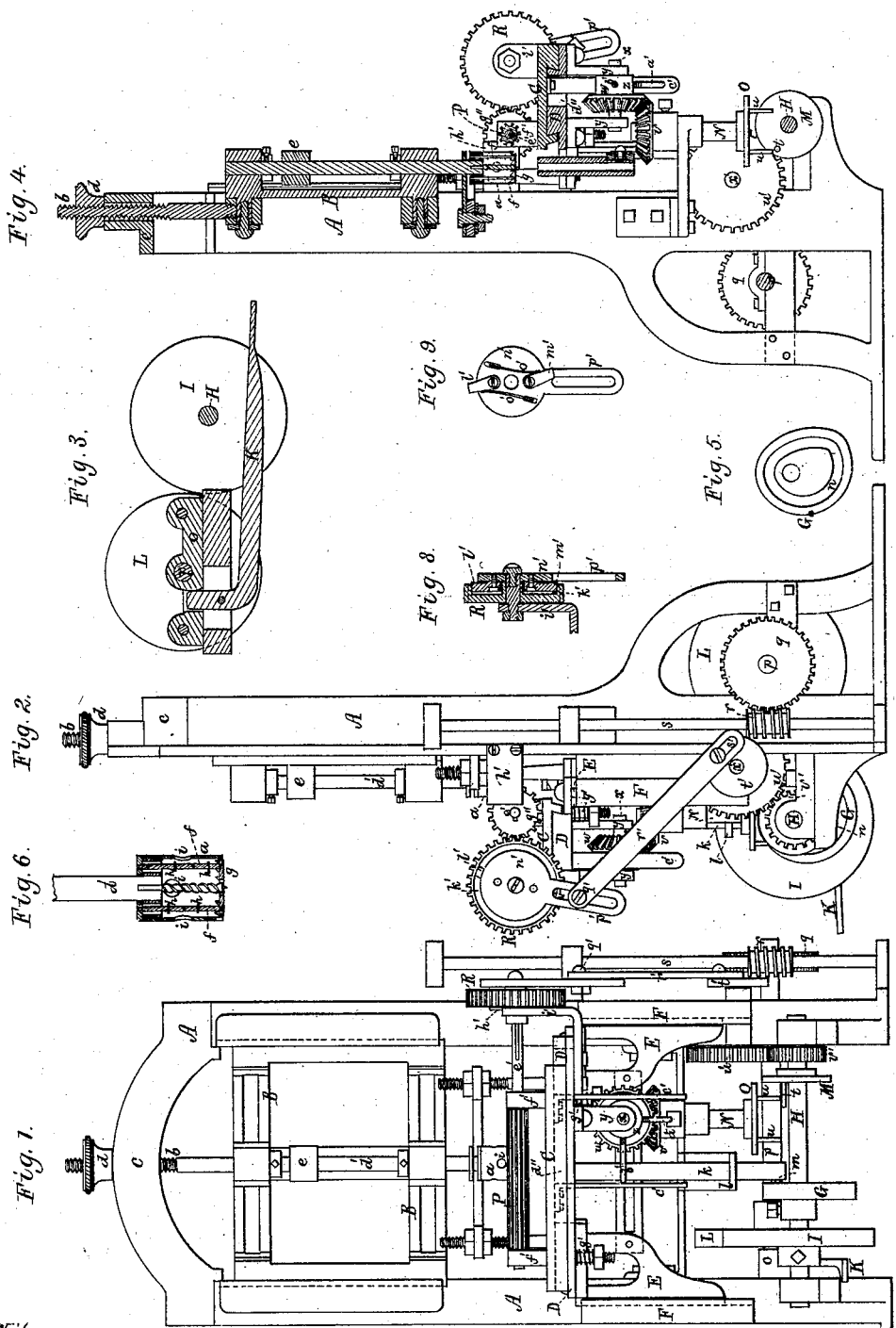
Witnesses:
S. N. Piper
E. B. Pratt
Inventor.
Charles E. Burns.
by R. H. Eddy, att'y (No Model.)

C. E. BURNS.
MACHINE FOR MANUFACTURING CYLINDRICAL BLOCKS.

No. 248,018.          Patented Oct. 11, 1881.

Witnesses
S. N. Piper
E. B. Pratt

Inventor.
Charles E. Burns,
by R. H. Eddy atty.

N. PETERS. Photo-Lithographer. Washington, D. C.

UNITED STATES PATENT OFFICE.

CHARLES E. BURNS, OF LANCASTER, ASSIGNOR TO HIMSELF AND HENRY C. LIBBY, OF BETHLEHEM, NEW HAMPSHIRE.

MACHINE FOR MANUFACTURING CYLINDRICAL BLOCKS.

SPECIFICATION forming part of Letters Patent No. 248,018, dated October 11, 1881.

Application filed July 18, 1881. (No model.)

*To all whom it may concern:*

Be it known that I, CHARLES EDWARD BURNS, of Lancaster, of the county of Coos and State of New Hampshire, have invented a new and useful Improvement in Machinery for Manufacturing Cylindrical Blocks for being Converted into Spools or various other Articles; and I do hereby declare the same to be described in the following specification and represented in the accompanying drawings, of which—

Figure 1 is a front elevation, and Fig. 2 a side view, of a machine embodying my invention. Fig. 3 is a section of its treadle and movable box, such figure showing also the friction-wheels next adjacent thereto. Fig. 4 is a vertical and transverse section of the machine. Fig. 5 is an inner side view of the grooved cam for vertically moving the table and its butt-carriage. Fig. 6 is a vertical section of the cylindrical saw and the mechanism for expelling the block therefrom, such section also showing the sawdust-agitating pins or studs. Fig. 7 is a top view of a butt or piece of wood, showing my economical method of separating it into blocks or cylinders in order to produce little waste and obtain from the butt the maximum number of cylinders of a given diameter to each. The remaining figures are hereinafter described.

The nature of my invention is defined by the claims hereinafter made.

Each cylinder removed from the butt is cut therefrom by means of a cylindrical tubular saw whose cutting-teeth are at its lower end. A series or gang of these saws is employed, they being arranged at distances apart equal to their respective internal diameters—that is to say, while the axes of these saws are disposed in one vertical plane each saw is to be separated from that next it by a distance equal to its internal diameter, each of the saws being of like size or diameter.

In Fig. 7, 1, 2, 3, 4, &c., represent the blocks or cylinders as formed in the butt of wood, each cylinder being from each one next adjacent it a distance equal to the thickness of the saw, such being denoted by the line *b c*. Each of the cylinders 7, 8, 9, &c., of the second row is intermediate of two of the cylinders of the first row, and also of two of those of the third row, such being as represented. The line through the centers of each row of cylinders is situated from the line through the centers of the next adjacent row a distance which equals the square root of three-fourths of the square of the distance between the axes of two next adjacent cylinders.

In the drawings but one cylindrical saw, *a*, is shown; but the practical working machine is to have six or other suitable number of them, each of such saws having its separate arbor or spindle carried by and duly supported in a frame, B, adapted to slide vertically in the main frame A of the machine. The saw-shaft-carrying frame B, adjustable vertically in the main frame, is provided with mechanism for effecting such adjustment, the said mechanism consisting of a screw, *b*, extending up from such frame B through the crown of the arch *c* of the main frame, and provided with one or more nuts, *d*. The object of so having the frame B thus adjustable is to regulate the distance of the saws from the butt-supporting carriage C as the thickness of the butt to be cut or the lengths of the saws from time to time may require.

Each saw arbor or spindle *d'* is provided with a driving-pulley, *e*, which is to be rotated by a belt from a suitable motor, and there is to each saw a block-clearer consisting of a disk, *g*, supported by two rods, *f f*, which slide vertically within the saw, all of which is to be and to operate substantially as is described in the United States Patent No. 237,242, recently granted to me—that is to say, while the saw may be entering the butt the disk *g* will be pushed upward by the latter, but afterward the rods, with the disk, will be forced downward by suitable means, so as to expel the block from the saw. The block-clearer revolves with the saw and is moved upward within it while it is cutting into a butt as it is forced upward by the block. The vertical movements of the clearer cause the pins *h* thereof to so act on the sawdust within the saw as to keep it stirred up or loose for it to be readily discharged by centrifugal force through the side holes of the saw. Without the pins in the rods of the block-clearer it is very difficult, if not impossible, to have the machine operate to practical advantage, for without a thorough clearance of the sawdust from the interior of the saw packing of the dust therein almost invariably takes place and impedes the correct action of the machine.

Through either or each of the rods $f$ one or more pins or studs, $h$, are inserted, such being to project from the rod and serve while the saw is in revolution to stir up and agitate the sawdust that may collect within it, and thereby enable such dust to be better discharged by centrifugal force through the holes $i$ in the saw. Beyond the addition of such pins or studs $h$ to the block-clearer, my present invention has reference not only to mechanism for automatically moving the table for supporting the butt-carriage, but to mechanism for automatically feeding or moving forward intermittently the butt.

The butt-carriage, in order to cause the saws while in revolution to cut into the butt, is to be forced upward, after which it is to be depressed to cause the butt to be drawn off the saws. After the first, third, and fifth of the blocks of the first row may have been cut the butt-carriage is to be moved to the right a distance equal to the internal diameter plus the thickness of a saw, such distance being represented by the line $a\,d$, Fig. 7. This having been done, the butt-carriage is next to be forced upward to cause the saws to again penetrate the butt and cut blocks 2, 4, and 6 between the previous perforations made therein. Next the butt-carriage is to be depressed, and the butt is to be fed forward under the saws the requisite distance (represented by the line $d\,e$) for the second row of blocks to be cut, and the butt-carriage is to be moved to the right a distance equal to half the internal diameter plus half the thickness of a saw, in which case the butt will be brought into position for having on its next rise the cylinders 7, 9, and 11 of the second row cut from it, which having been accomplished and the butt-carriage again depressed, such carriage is to be laterally moved to the left a distance equal to the internal diameter plus the thickness of a saw, whereby the butt will have been brought into a position for the intermediate cylinders, 8, 10, and 12, to be cut from it during its next rise, which having taken place and the butt-carriage having again descended, the butt is to be next fed forward the requisite distance for the third row to be cut and the butt-carriage is to be moved to the left a distance equal to half the internal diameter plus half the thickness of a saw, in which case the operations above described may be repeated, so as to sever from the butt, in manner as described, a third and a fourth row of cylinders or blocks.

The butt-carriage C is supported by and so as to move laterally and rectilinearly on the table D, which is adapted to the frame A, so as to be vertically movable, slides E E extending down from the table and entering suitable guides, F F, projecting from the main frame A. Fixed to and extending down from the table is a rod, $k$, which passes into and through a stationary guide, $l$, and is provided with a stud or friction-roller, $m$, to enter the groove $n$ of a cam, G, such groove being suitably formed to impart to the table its proper intermittent vertical movements. The said cam is fixed on a horizontal shaft, H, arranged, as shown, in the frame A, such shaft being provided with a friction-wheel, I, against which, by means of a foot-lever or treadle, K, suitably fulcrumed in the frame A and adapted to a slide-box, $o$, another friction-wheel, L, whose shaft $p$ is journaled in such box, may be borne, so as while revolving to revolve the said wheel I and the cam-shaft H. A worm-gear, $q$, fixed on the shaft $p$ engages with a screw or worm, $r$, carried by a vertical shaft, $s$, which, while the machine may be in action, is to be revolved by suitable means.

To start the machine into operation while the wheel L may be revolving, an attendant is to place his foot on the treadle and bear it downward, so as to cause the periphery of the friction-wheel L to be forced against that of the wheel I. The treadle when so depressed may be kept so by a suitable latch or device applied to the frame.

The next part of the machine to be described is the automatic machinery for effecting the lateral movements of the butt-carriage C in the order as hereinbefore described. There is fixed on the cam-shaft H a disk or wheel, M, provided with a stud or prong, $t$, extending from its inner side.

Above the shaft H is another and vertical shaft, N, which, suitably supported in the frame A, has fixed to it a pin-wheel, O, provided with a series of pins, $u$, projecting down from it. On the upper part of the shaft N is a bevel-gear, $v$, that engages with another bevel-gear, $w$, fixed on a horizontal shaft, $x$, such shaft being journaled in brackets $y$ extending down from the table D.

On the shaft $x$ is a wheel, $z$, from whose periphery two fingers, $a'\,b'$, project, with their axes radial to the axis of the shaft $x$ and at a right angle to each other. Each finger is a pin screwed into the wheel, and it may be provided, if necessary, with a check-nut to keep it from accidentally unscrewing. One of these fingers is longer than the other, and they, with their supporting-wheel, are placed directly between two brackets or arms, $c'$, extending vertically down from the butt-carriage and through a long slot, $d''$, made in the table D, and of sufficient length to allow of the proper lateral movements of the said carriage.

The grooved feed-roll for advancing the butt is shown at P, its shaft $e'$ being supported in vertically-sliding boxes $f'$, provided with spiral springs $g'$ to draw them downward. The said shaft $e'$ extends loosely through a gear, $g''$, projecting between the prongs of a fork, $h'$, fixed to the frame, the said gear and shaft having a spline or feather connection, such as will cause the gear, while in revolution, to revolve the shaft. The gear $g''$ engages with another and larger gear, R, pivoted loosely upon a stud projecting from a bracket, $i'$, extending from the table D, in manner as shown. The gear R has a circular recess, $k'$, on its outer side to receive two friction-pawls, $l'$ $m'$, extending from a wheel, $n'$, pivoted on the stud that supports the gear R. Each pawl has a spring, $o'$, adapted to it and the wheel $n'$, such spring being to force the pawl against the periphery of the recess $k'$.

Fig. 8 is a vertical section of the gear R and the wheel $n'$ and the pawls $l'$ $m'$.

Fig. 9 is an inner side view of the said pawls $l'$ $m'$, their springs $o'$, and supporting-wheel $n'$.

Figure 7:
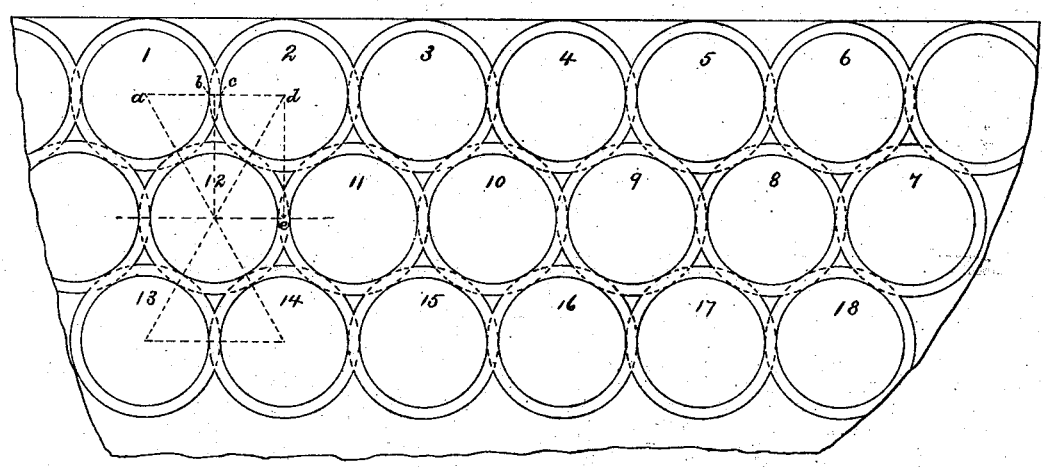

From the wheel $n'$ a slotted arm, $p'$, extends downward and receives the joint-pin $q'$ of a connection-rod, $r'$, which, slotted in its lower part, as shown as $s'$, receives in the slot the wrist of a cranked wheel, $t'$. This wheel $t'$ is fixed on a horizontal shaft, $x'$, provided with a gear, $u'$, to engage with another gear, $v'$, fixed on the cam-shaft. On the cranked wheel being revolved through the action of the gears $u'$ $v'$, an intermittent rotary motion will be imparted to the feed-roll P. So, during revolutions of the cam-shaft, the prong $t$ of the wheel M will be carried against the pins of the pin-wheel O successively, whereby the shaft N will be intermittently revolved, in consequence of which the finger-wheel $z$ will be intermittently revolved, and by means of its two fingers $a'$ $b'$, acting successively against the brackets or arms $c'$ $c'$, will effect lateral movements of the butt-carriage, with suitable intervals of rest thereto, substantially as hereinbefore described.

Having thus explained my improved machine, what I claim therein as my present invention is as follows, viz:

1. The combination for effecting the lateral intermittent movements of the butt-carriage C, it consisting of the two brackets or arms $c'$, the rotary wheel $z$, and its adjustable fingers $a'$ $b'$, and its shaft $x$, the bevel-gears $v$ $w$, shaft N, pin-wheel O, and its rotary actuator or pronged wheel M, carried by the cam-shaft, as set forth.

2. The combination for operating the cam-shaft H, such consisting of the friction-wheels I L, treadle K, movable box $o$, shaft $p$, worm-gear $q$, and the worm $r$ and its shaft $s$, arranged and adapted substantially as set forth.

3. The combination of the cam-shaft-operating mechanism (consisting of the friction-wheels I L, treadle K, movable box $o$, shaft $p$, worm-gear $q$, worm $r$, and shaft $s$) with such cam-shaft H and the mechanism for effecting lateral movements of the butt-carriage, and consisting of the pronged wheel M, pin-wheel O, shaft N, gears $v$ $w$, shaft $x$, wheel $z$, adjustable fingers $a'$ $b'$, and the brackets or arms $c'$, all being arranged and adapted substantially as set forth.

4. The combination for operating the butt-feeding roll, such consisting of the gears $g''$ R, pawls $l'$ $m'$, spring $o'$, wheel $n'$, the slotted arm $p'$, connection-rod $r'$, cranked wheel $t'$, its shaft $x'$, and the gears $u'$ $v'$, all being applied substantially as set forth.

5. The combination of the butt-carriage C, its movable table D, and the cam-shaft H with the cam G and studded rod $k$, and with the mechanism, substantially as described, for automatically effecting intermittent lateral movements of the said carriage, such mechanism consisting of the two brackets or arms $c'$, rotary wheel $z$, adjustable fingers $a'$ $b'$, shaft $x$, gears $v$ $w$, shaft N, pin-wheel O, and pronged wheel M, all being essentially as set forth.

6. The combination, with the tubular saw $a$ and the block-expeller $g$ thereof, as described, of one or more pins or studs, $h$, applied to and arranged with either or each of the rods $k$ of said expeller, and to operate in manner and for the purpose set forth.

CHARLES EDWARD BURNS.

Witnesses:
FRANK W. POOLE,
J. W. FLANDERS.